(12) United States Patent
Moreno et al.

(10) Patent No.: US 11,594,230 B2
(45) Date of Patent: Feb. 28, 2023

(54) SPEAKER VERIFICATION

(71) Applicant: Google LLC, Mountain View, CA (US)

(72) Inventors: Ignacio Lopez Moreno, New York, NY (US); Li Wan, Forest Hills, NY (US); Quan Wang, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 116 days.

(21) Appl. No.: 17/307,704

(22) Filed: May 4, 2021

(65) Prior Publication Data

US 2021/0256981 A1 Aug. 19, 2021

Related U.S. Application Data

(63) Continuation of application No. 16/557,390, filed on Aug. 30, 2019, now Pat. No. 11,017,784, which is a
(Continued)

(51) Int. Cl.
*G10L 17/24* (2013.01)
*G10L 17/22* (2013.01)
(Continued)

(52) U.S. Cl.
CPC .............. *G10L 17/24* (2013.01); *G10L 17/02* (2013.01); *G10L 17/08* (2013.01); *G10L 17/14* (2013.01); *G10L 17/18* (2013.01); *G10L 17/22* (2013.01)

(58) Field of Classification Search
None
See application file for complete search history.

(56) References Cited

U.S. PATENT DOCUMENTS

| | | |
|---|---|---|
| 4,799,262 A | 1/1989 | Feldman et al. |
| 4,868,867 A | 9/1989 | Davidson et al. |

(Continued)

FOREIGN PATENT DOCUMENTS

| | | |
|---|---|---|
| CA | 2609247 A1 | 11/2006 |
| EP | 0715298 A1 | 6/1996 |

(Continued)

OTHER PUBLICATIONS

Williams, Gethin, et al. "Speech/Music Discrimination Based on Posterior Probability Features," Submitted to Eurospeech '99, Budapest, 4 pages.

(Continued)

*Primary Examiner* — Shaun Roberts
(74) *Attorney, Agent, or Firm* — Honigman LLP; Brett A. Krueger; Grant Griffith

(57) ABSTRACT

Methods, systems, apparatus, including computer programs encoded on computer storage medium, to facilitate language independent-speaker verification. In one aspect, a method includes actions of receiving, by a user device, audio data representing an utterance of a user. Other actions may include providing, to a neural network stored on the user device, input data derived from the audio data and a language identifier. The neural network may be trained using speech data representing speech in different languages or dialects. The method may include additional actions of generating, based on output of the neural network, a speaker representation and determining, based on the speaker representation and a second representation, that the utterance is an utterance of the user. The method may provide the user with access to the user device based on determining that the utterance is an utterance of the user.

20 Claims, 5 Drawing Sheets

Related U.S. Application Data continuation of application No. PCT/US2017/040906, filed on Jul. 6, 2017, which is a continuation of application No. 15/211,317, filed on Jul. 15, 2016, now abandoned.

(51) Int. Cl.
  *G10L 17/02* (2013.01)
  *G10L 17/08* (2013.01)
  *G10L 17/14* (2013.01)
  *G10L 17/18* (2013.01)

(56) References Cited

U.S. PATENT DOCUMENTS

| | | |
|---|---|---|
| 5,150,449 A | 9/1992 | Yoshida et al. |
| 5,444,488 A | 8/1995 | Goubault et al. |
| 5,465,318 A | 11/1995 | Sejnoha |
| 5,509,103 A | 4/1996 | Wang |
| 5,542,006 A | 7/1996 | Shustorovich et al. |
| 5,600,753 A | 2/1997 | Iso |
| 5,627,939 A | 5/1997 | Huang et al. |
| 5,636,325 A | 6/1997 | Farrett |
| 5,680,508 A | 10/1997 | Liu |
| 5,689,616 A | 11/1997 | Li |
| 5,729,656 A | 3/1998 | Nahamoo et al. |
| 5,729,694 A | 3/1998 | Holzrichter et al. |
| 5,745,872 A | 4/1998 | Sonmez et al. |
| 6,038,528 A | 3/2000 | Mammone et al. |
| 6,067,517 A | 5/2000 | Bahl et al. |
| 6,141,642 A | 10/2000 | Oh |
| 6,188,982 B1 | 2/2001 | Chiang |
| 6,260,013 B1 | 7/2001 | Sejnoha |
| 6,381,569 B1 | 4/2002 | Sih et al. |
| 6,397,179 B2 | 5/2002 | Crespo et al. |
| 6,434,520 B1 | 8/2002 | Kanevsky et al. |
| 6,519,561 B1 | 2/2003 | Farrell et al. |
| 6,631,348 B1 | 10/2003 | Wymore |
| 6,665,644 B1 | 12/2003 | Kanevsky et al. |
| 6,675,143 B1 | 1/2004 | Barnes et al. |
| 6,876,966 B1 | 4/2005 | Deng et al. |
| 6,920,423 B2 | 7/2005 | Mueller et al. |
| 7,043,431 B2 | 5/2006 | Riis et al. |
| 7,062,442 B2 | 6/2006 | Berg et al. |
| 7,065,487 B2 | 6/2006 | Miyazawa |
| 7,275,032 B2 | 9/2007 | Macleod |
| 7,406,408 B1 | 7/2008 | Lackey et al. |
| 7,409,340 B2 | 8/2008 | Holzapfel et al. |
| 7,424,426 B2 | 9/2008 | Furui et al. |
| 7,593,842 B2 | 9/2009 | Rousseau |
| 7,765,101 B2 | 7/2010 | En-Najjary et al. |
| 7,844,466 B2 | 11/2010 | Roy |
| 7,848,924 B2 | 12/2010 | Nurminen et al. |
| 7,912,727 B2 | 3/2011 | Gao et al. |
| 7,996,222 B2 | 8/2011 | Nurminen et al. |
| 8,073,696 B2 | 12/2011 | Kato et al. |
| 8,170,878 B2 | 5/2012 | Liu et al. |
| 8,204,739 B2 | 6/2012 | Waibel et al. |
| 8,239,195 B2 | 8/2012 | Li et al. |
| 8,260,615 B1 | 9/2012 | Nakajima et al. |
| 8,340,308 B2 | 12/2012 | Chen et al. |
| 8,442,125 B2 | 5/2013 | Covell et al. |
| 8,442,830 B2 | 5/2013 | Nakajima et al. |
| 8,463,719 B2 | 6/2013 | Lyon et al. |
| 8,615,397 B2 | 12/2013 | Hart |
| 8,744,847 B2 | 6/2014 | Paul et al. |
| 8,751,238 B2 | 6/2014 | James et al. |
| 8,782,012 B2 | 7/2014 | Fusco et al. |
| 8,849,185 B2 | 9/2014 | Cheung et al. |
| 8,965,112 B1 | 2/2015 | Ibarz et al. |
| 9,123,338 B1 | 9/2015 | Sanders et al. |
| 9,195,656 B2 | 11/2015 | Fructuoso et al. |
| 9,230,550 B2 | 1/2016 | Hosom et al. |
| 9,263,036 B1 | 2/2016 | Graves |
| 9,299,347 B1 | 3/2016 | Siohan et al. |
| 9,401,148 B2 | 7/2016 | Lei et al. |
| 9,978,374 B2 | 5/2018 | Heigold et al. |
| 2001/0001141 A1 | 5/2001 | Sih et al. |
| 2002/0072909 A1 | 6/2002 | Eide et al. |
| 2002/0165715 A1 | 11/2002 | Riis et al. |
| 2003/0033143 A1 | 2/2003 | Aronowitz |
| 2003/0088411 A1 | 5/2003 | Ma et al. |
| 2004/0024585 A1 | 2/2004 | Srivastava et al. |
| 2004/0049375 A1 | 3/2004 | Brittan et al. |
| 2004/0111272 A1 | 6/2004 | Gao et al. |
| 2004/0138882 A1 | 7/2004 | Miyazawa |
| 2004/0162722 A1 | 8/2004 | Rex et al. |
| 2004/0172238 A1 | 9/2004 | Choo et al. |
| 2004/0181408 A1 | 9/2004 | Acero et al. |
| 2004/0230424 A1 | 11/2004 | Gunawardana |
| 2004/0260546 A1 | 12/2004 | Seo et al. |
| 2004/0260550 A1 | 12/2004 | Burges et al. |
| 2005/0144003 A1 | 6/2005 | Iso-Sipila |
| 2005/0187773 A1 | 8/2005 | Filoche et al. |
| 2005/0228673 A1 | 10/2005 | Nefian et al. |
| 2005/0267755 A1 | 12/2005 | Suontausta |
| 2006/0053008 A1 | 3/2006 | Droppo et al. |
| 2006/0149558 A1 | 7/2006 | Kahn et al. |
| 2006/0184362 A1 | 8/2006 | Preuss et al. |
| 2006/0195317 A1 | 8/2006 | Graciarena et al. |
| 2006/0253272 A1 | 11/2006 | Gao et al. |
| 2007/0088552 A1 | 4/2007 | Olsen |
| 2007/0118373 A1 | 5/2007 | Wise et al. |
| 2007/0179785 A1 | 8/2007 | Herry et al. |
| 2007/0208566 A1 | 9/2007 | En-Najjary et al. |
| 2008/0004858 A1 | 1/2008 | Gao et al. |
| 2008/0300875 A1 | 12/2008 | Yao et al. |
| 2009/0055160 A1 | 2/2009 | Gao et al. |
| 2009/0099841 A1 | 4/2009 | Chen |
| 2009/0254343 A1 | 10/2009 | Hart |
| 2009/0281789 A1 | 11/2009 | Waibel et al. |
| 2010/0057435 A1 | 3/2010 | Kent et al. |
| 2010/0198577 A1 | 8/2010 | Chen et al. |
| 2010/0318354 A1 | 12/2010 | Seltzer et al. |
| 2011/0103614 A1 | 5/2011 | Cheung et al. |
| 2011/0173208 A1 | 7/2011 | Vogel |
| 2011/0238407 A1 | 9/2011 | Kent |
| 2011/0238416 A1 | 9/2011 | Seltzer et al. |
| 2011/0275348 A1 | 11/2011 | Clark et al. |
| 2011/0307253 A1 | 12/2011 | Lloyd et al. |
| 2012/0004909 A1 | 1/2012 | Beltman et al. |
| 2012/0065976 A1 | 3/2012 | Deng et al. |
| 2012/0130714 A1 | 5/2012 | Zeljkovic et al. |
| 2012/0143604 A1 | 6/2012 | Singh |
| 2012/0173241 A1 | 7/2012 | Li et al. |
| 2012/0191457 A1 | 7/2012 | Minnis et al. |
| 2012/0253781 A1 | 10/2012 | Qian et al. |
| 2013/0041669 A1 | 2/2013 | Ben-David et al. |
| 2013/0080167 A1 | 3/2013 | Mozer |
| 2013/0138436 A1 | 5/2013 | Yu et al. |
| 2013/0223645 A1 | 8/2013 | Hetherington et al. |
| 2013/0225128 A1 | 8/2013 | Gomar |
| 2013/0238324 A1 | 9/2013 | Ichikawa |
| 2013/0289998 A1 | 10/2013 | Eller et al. |
| 2013/0297299 A1 | 11/2013 | Chakrabartty et al. |
| 2013/0325473 A1 | 12/2013 | Larcher et al. |
| 2013/0343641 A1 | 12/2013 | Mnih et al. |
| 2014/0012586 A1 | 1/2014 | Rubin et al. |
| 2014/0019138 A1 | 1/2014 | Stephens, Jr. |
| 2014/0142929 A1 | 5/2014 | Seide et al. |
| 2014/0156575 A1 | 6/2014 | Sainath et al. |
| 2014/0188487 A1 | 7/2014 | Perez Gonzalez et al. |
| 2014/0214417 A1 | 7/2014 | Wang et al. |
| 2014/0257804 A1 | 9/2014 | Li et al. |
| 2014/0278435 A1 | 9/2014 | Ganong, III et al. |
| 2014/0372112 A1 | 12/2014 | Xue et al. |
| 2015/0039299 A1 | 2/2015 | Weinstein et al. |
| 2015/0066499 A1 | 3/2015 | Wang et al. |
| 2015/0100530 A1 | 4/2015 | Mnih et al. |
| 2015/0127327 A1 | 5/2015 | Bacchiani et al. |
| 2015/0127336 A1 | 5/2015 | Lei et al. |
| 2015/0127342 A1 | 5/2015 | Sharifi et al. |
| 2015/0127594 A1 | 5/2015 | Parada San Martin et al. |
| 2015/0186359 A1 | 7/2015 | Fructuoso et al. |

(56) References Cited

U.S. PATENT DOCUMENTS

| | | |
|---|---|---|
| 2015/0199963 A1 | 7/2015 | Maaninen |
| 2015/0221305 A1 | 8/2015 | Sharifi |
| 2015/0248885 A1 | 9/2015 | Koulomzin |
| 2015/0332665 A1 | 11/2015 | Mishra et al. |
| 2015/0340034 A1 | 11/2015 | Schalkwyk et al. |
| 2015/0364129 A1 | 12/2015 | Gonzalez-Dominguez et al. |
| 2015/0371633 A1 | 12/2015 | Chelba |
| 2016/0071512 A1 | 3/2016 | Fructuoso et al. |
| 2016/0093294 A1 | 3/2016 | Kapralova et al. |
| 2016/0125877 A1 | 5/2016 | Foerster |
| 2016/0171977 A1 | 6/2016 | Siohan et al. |
| 2016/0267913 A1 | 9/2016 | Kim et al. |
| 2018/0018973 A1 | 1/2018 | Moreno et al. |
| 2018/0277124 A1 | 9/2018 | Moreno et al. |

FOREIGN PATENT DOCUMENTS

| | | |
|---|---|---|
| EP | 2431969 A1 | 3/2012 |
| EP | 2507790 B1 | 1/2014 |
| EP | 2905780 A1 | 8/2015 |
| RU | 2161336 C2 | 12/2000 |
| WO | 98022936 A1 | 5/1998 |
| WO | 2002093934 A1 | 11/2002 |
| WO | 2010047816 A1 | 4/2010 |
| WO | 2012025579 A1 | 3/2012 |

OTHER PUBLICATIONS

Wollmer et al., "Probabilistic ASR Feature Extraction Applying Context-Sensitive Connectionist Temporal Classification Networks," Acoustics, Speech and Signal Processing (ICASSP), 2013 IEEE International Conference on, pp. 7125-7129, 2013.

Wu et al., "State mapping based method for cross-lingual speaker adaptation in HMM-based speech synthesis", In Interspeech—2009, pp. 528-531, 2009.

Xydas and Kouroupetroglou, "Tone-Group Fo selection for modeling focus prominence in small-footprint speech synthesis," Speech Communication, 2006, 48(9):1057-1078.

Yegnanarayana et al., "AANN: an alternative to GMNI for pattern recognition," Neural Networks, 15(3):459-469, 2002.

Young et al., "Tree-based state tying for high accuracy acoustic modelling," in Proc. ARPA Human Language Technology Workshop, pp. 307-312, Mar. 1994.

Yu et al., "Exploiting Sparseness In Deep Neural Networks For Large Vocabulary Speech Recognition," in ICASSP 2012. IEEE SPS, Mar. 2012, pp. 4409-4412.

Yu et al., "Unsupervised training and directed manual transcription for LVCSR," Speech Communication, vol. 52, No. 7-8, pp. 652-663, Jul. 2010.

Zeiler et al., "On rectified linear units for speech processing," in 38th International Conference on Acoustics, Speech and Signal Processing (ICASSP), 2013.

Zen et al., "Statistical Parametric Speech Synthesis Based on Speaker and Language Factorization," IEEE Transactions on Audio, Speech & Language Processing, 2012, 12 pages.

Zen et al., "Statistical Parametric Speech Synthesis Using Deep Neural Networks," in Proceedings of 38th International Conference on Acoustics, Speech, and Signal Processing (ICASSP 2013), pp. 7962-7966, May 2013, 5 pages.

KR Office Action issued in Korean Application No. 10-2018-7009479, dated Sep. 24, 2019, 10 pages (with English translation).

"Artificial neural network," From Wikipedia, the free encyclopedia, last modified on Oct. 4, 2015 [retrieved on Oct. 8, 2015]. Retrieved from the Internet: URL<https//en.wikipedia.org/Artificial_neural_network>, 14 pages.

"Convolutional neural network," From Wikipedia, the free encyclopedia, last modified on Sep. 10, 2015 [retrieved on Oct. 8, 2015]. Retrieved from the Internet: URL<https://en.wikipedia.org/wiki/Convolutional_neural_network>, 9 pages.

"Intonation (Linguistics)," Wikipedia, the free encyclopedia, accessed Aug. 27, 2013, 11 pages, http://en.wikipedia.org/wiki/Intonation_(linguistics).

"Isochrony," Wikipedia, the free encyclopedia, accessed Aug. 27, 2013, 4 pages, http://en.wikipedia.org/wiki/Isochrony.

"Locality-Sensitivity Hashing," Wikipedia, downloaded from the internet on Jun. 16, 2014, 7 pages, http://en.wikipedia.org/wiki/Locality-sensitive_hashing.

"Long short-term memory," From Wikipedia, the free encyclopedia, last modified on Oct. 5, 2015 [retrieved on Oct. 8, 2015]. Retrieved from the Internet: URL<https//en.wikipedia.org/wiki/Long_short-term_memory>, 4 pages.

"Machine translator speaks Chinese in your own voice," New Scientist blog post dated Nov. 9, 2012, found online at: http://www.newscientist.com/blogs/onepercent/2012/11/micirosofts-brainlike-tranlat.html.

"Neural Network," Wikipedia, the free encyclopedia, accessed Aug. 27, 2013, 9 pages, http://en.wikipedia.org/wiki/Neural_network.

"Prosody (linguistics)," Wikipedia, the free encyclopedia, accessed Aug. 27, 2013, 5 pages, http://en.wikipedia.org/wiki/Prosody (linguistics).

"Recurrent neural network," From Wikipedia, the free encyclopedia, last modified on Sep. 30, 2015 [retrieved on Oct. 8, 2015]. Retrieved from the Internet: URL<https://wikipedia.org/wiki/Recurrent neural_network>, 9 pages.

"Speech recognition," From Wikipedia, the free encyclopedia, last modified on Oct. 1, 2015 [retrieved on Oct. 8, 2015]. Retrieved from the Internet: URL<https://en.wikipedia.org/wiki/Speech recognition>, 16 pages.

"Speech Synthesis," Wikipedia, the free encyclopedia, accessed Aug. 27, 2013, 16 pages, http://en.wikipedia.org/wiki/Speech_synthesis.

"Stress (linguistics)," Wikipedia, the free encyclopedia, accessed Aug. 27, 2013, 6 pages, http://en.wikipedia.org/wiki/Stress_(linguistics).

"Time delay neural network," From Wikipedia, the free encyclopedia, last modified on Mar. 23, 2015 [retrieved on Oct. 8, 2015]. Retrieved from the Internet: URL<https://enwikipedia.org/wiki/Time_delay_neural_network>, 1 page.

Agiuero et al., "Automatic analysis and synthesis of Fujisaki's intonation model for TTS," Speech Prosody 2004, International Conference, 2004, 4 pages.

Aronowitz et al., "New developments in voice biometrics for user Authentication," in Interspeech, Aug. 2011, pp. 17-20.

Aronowitz, "Text-dependent speaker verification using a small development set," in Proc. Odyssey Speaker and Language Recognition Workshop, 2012, 28 pages.

Auckenthaler et al., "Score normalization for text-independent speaker verification systems," Digital Signal Processing, 10:42-54, 2000.

Bahl et al., "Context Dependent Modeling of Phones in Continuous Speech Using Decision Trees," HLT '91 Proceedings of the workshop on Speech and Natural Language, pp. 264-269, 1991.

Bennani et al., "Connectionist approaches for automatic speaker recognition," in ESCA Workshop on Automatic Speaker Recognition, Identification and Verification, 1990, 265-268.

Bluche et al., "Framewise and CTC Training of Neural Networks for Handwriting Recognition," International Conference on Document Analysis and Recognition—ICDAR, 2015, pp. 81-85.

Boula de Mareuil et al., "Contribution of Prosody to the Perception of Spanish/Italian accents," Speech Prosody 2004, International Conference, 2004, 4 pages.

Brants et al., "Large language models in machine translation," in EMNLP, Jun. 2007, pp. 858-867.

Chen et al., "Locally-Connected and Convolutional Neural Networks for Small Footprint Speaker Recognition," Sixteenth Annual Conference of the International Speech Communication Association, Sep. 2015, pp. 1136-1140.

Chen et al., "Small-footprint keyword spotting using deep neural networks," Acoustics, Speech and Signal Processing (ICASSP), 2014 IEEE International Conference on, May 2014, pp. 4087-4091.

(56) References Cited

OTHER PUBLICATIONS

Chou, "Optimal partitioning for classification and regression trees," IEEE Trans. on Pattern Analysis and Machine Intelligence, vol. 13, No. 4, pp. 340-354, Apr. 1991.
Coates and Ng, "The importance of encoding versus training with sparse coding and vector quantization," in Proceedings of the 28th International Conference on Machine Learning (ICML—11), Jun. 2011, pp. 921-928.
Cummins and Port, "Rhythmic constraints on stress timing in English," Journal of Phonetics, 1998, 26:145-171.
Dahl et al. "Context-Dependent Pre-Trained Deep Neural Networks for Large-Vocabulary Speech Recognition", IEEE, Trans., ASLP vol. 20 No. 1, Jan. 2012.
Dahl et al., "Improving deep neural networks for LVCSR using rectified linear units and dropout," in Proc. ICASSP, 2013, 5 pages.
Das et al. "Multilingual spoken-password based user authentication in emerging economies using cellular phone networks," Spoken Language Technology Workshop, Dec. 15, 2008, 4 pages.
Dean et al., "Large Scale Distributed Deep Networks," Proc. Neural Information Processing Systems, pp. 1232-1240, Dec. 2012.
Dehak et al., "Front-end factor analysis for speaker verification," IEEE Transactions on Audio, Speech, and Language Processing, 19: 788-798, 2011.
Deng and Dahl, "Roles of pre-training and fine-tuning in context-dependent DBN-HM Ms for real-world speech recognition," in NIPS, 2010, 8 pages.
Donahue et al., "Decaf: A deep convolutional activation feature for generic visual recognition," arXiv preprint arXiv:1310.1531, Oct. 2013, 10 pages.
EP Extended European Search Report issued in European Application No. 18165912.9, dated Jul. 27, 2018, 10 pages.
Erdem et al., "An Adaptable Acoustic Architecture in a Multilingual TTS System," Proceedings of International Conference: Speech Prosody 2004, Nara-Ken New Public Hall, Nara, Japan, Mar. 23-26, 2004, 4 pages.
Eyben et al., "From Speech to Letters—Using a Novel Neural Network Architecture for Grapheme Based ASR," Automatic Speech Recognition & Understanding, 2009, ASRU 2009, IEEE Workshop on, pp. 376-380, 2009.
Fackerell et al., "Multilingual Prosody Modelling Using Cascades of Regression Trees and Neural Networks," Proceedings Eurospeech, 1999, 4 pages.
Fernandez et al., "Phoneme recognition in TIMIT with BLSTM-CTC," Technical Report No. IDSIA-04-08, Apr. 2008, 7 pages.
Finan et al., "Comparison of multilayer and radial basis function neural networks for text-dependent speaker recognition," Neural Networks, 1996, IEEE International Conference on. vol. 4 IEEE, 1996, pp. 1992-1997.
Fiscus, "A post-processing system to yield reduced word error rates: Recognizer output voting error reduction (ROVER)," in IEEE Automatic Speech Recognition and Understanding Workshop (ASRU), pp. 347-354, Dec. 1997.
Garimella et al., "Factor analysis of auto-associative neural networks with application in speaker verification," IEEE transactions on neural networks and learning systems 24(4):522-528. Apr. 2013.
Goffin et al., "The AT&T Watson Speech Recognizer," in Proceedings of ICASSP 2005, 4 pages.
Goodfellow et al., "Maxout networks," in Proc. JMLR, 2013, 1319-1327.
Graves et al., "A Novel Connectionist System for Unconstrained Handwriting Recognition," Pattern Analysis and Machine Intelligence, IEEE Transactions on, 31(5):855-868, May 2008.
Graves et al., "Connectionist temporal classification: Labelling unsegmented sequence data with recurrent neural networks," in Proceedings of the 23rd International Conference on Machine Learning, ACM, pp. 369-376, Jun. 2006.
Graves et al., "Framewise Phoneme Classification with Bidirectional LSTM and Other Neural Network Architectures," Neural Networks, 18(5):602-610, Aug. 2005.
Graves et al., "Speech Recognition With Deep Recurrent Neural Networks," arXiv:1303.5778v1 [cs.NE], Mar. 2013, 5 pages.
Graves et al., "Towards End-to-End Speech Recognition with Recurrent Neural Networks," Proceedings of the 31st International Conference on Machine Learning, vol. 32, pp. 1764-1772, 2014.
Graves, "Supervised Sequence Labelling with Recurrent Neural Networks," Studies in Computational Intelligence, vol. 385, 137 pages, 2012.
Grosz et al., "A Sequence Training Method for Deep Rectifier Neural Networks in Speech Recognition," Speech and Computer. Springer International Publishing, 2014, pp. 81-88.
Hartman, "Training feed-forward neural networks with gain constraints," Neural Computation, 12(4):811-829, Apr. 2000, Abstract only, 1 page.
Hassibi et al., "Second order derivatives for network pruning: Optimal brain surgeon," in Advances in Neural Information Processing Systems 5, 1993, pp. 164-171.
Hattori et al., "Speaker-adaptive speech synthesis based on eigenvoice conversion and language dependent prosodic conversion in speech-to-speech translation," In Interspeech—2011, pp. 2769-2772, 2011.
Heigold et al., "End-to-End Text-Dependent Speaker Verification," arXiv preprint arXiv:1509.08062, Sep. 27, 2015, 5 pages.
Hermansky et al., "Tandem connectionist feature extraction for conventional HMM systems," in IEEE International Conference on Acoustics, Speech, and Signal Processing (ICASSP), pp. 1635-1638, Jun. 2000.
Hinton et al., "Deep neural networks for acoustic modeling in speech recognition," IEEE Signal Processing Magazine, 29:82-97, Nov. 2012.
Hinton et al., "Distilling the Knowledge in a Neural Network," arXiv preprint arXiv:1503.02531, Mar. 2015, 9 pages.
Hinton et al., "Improving neural networks by preventing co-adaptation of feature detectors," in arXive preprint, 2012, 1-18.
Hochreiter and Schmidhuber, "Long short-term memory," Neural Computation, 9(8):1735-1780, Nov. 1997.
Hoffmann et al., "Evaluation of a Multilingual TTS System with Respect to the Prosodic Quality," Proceedings of International Congress of Phonetic Sciences (ICPhS), 1999, 2307-2310.
Huang et al., "Semi-supervised GMM and DNN acoustic model training with multi-system combination and confidence re-calibration," in Interspeech, Aug. 2013, pp. 2360-2364.
Hwang and Chen, "Neural-network-based F0 text-to-speech synthesizer for Mandarin," IEE Proc. Vis. Image Signal Process, Dec. 1994, 141:384-390.
International Preliminary Report on Patentability issued in International Application No. PCT/US2017/040906, dated Jan. 24, 2019, 11 pages.
International Search Report and Written Opinion issued in International Application No. PCT/US2017/040906, dated Dec. 1, 2017, 19 pages.
Invitation to Pay Additional Fees and, Where Applicable, Protest Fee with partial search report, issued in International Application No. PCT/US2017/040906, dated Oct. 9, 2017, 15 pages.
Iriondo et al., "Modelado y Estimoacion de la Prosodia Mediante Razonamiento Basado en Casos," Zaragoza, Nov. 2006, 183-188 (English Abstract).
Jaitly et al., "Application of pretrained deep neural networks to large vocabulary speech recognition," in Interspeech, 2012, 4 pages.
Jarrett et al., "What is the best multi-stage architecture for object recognition?" in ICCV. IEEE, 2009, pp. 2146-2153.
Jiang, "Confidence measures for speech recognition: A survey," Speech Communication, vol. 45, No. 4, pp. 455-470, Apr. 2005.
Jokisch et al., "Towards a Multilingual Prosody Model for Text-to-Speech," IEEE ICASSP, 2002, 421-424.
Kenny et al., "A study of interspeaker variability in speaker verification," IEEE Transactions on Audio, Speech, and Language Processing, 16: 980-988, 2008.
Kenny et al., "Joint Factor Analysis versus Eigenchannels in Speaker Recognition," IEEE Transactions on Audio, Speech, and Language Processing, 15: 1435-1447, 2007.
Kenny et al., "Speaker and session variability in GMM-based speaker verification," IEEE Transactions on Audio, Speech, and Language Processing, 15: 1448-1460, 2007.

(56) References Cited

OTHER PUBLICATIONS

Kenny, "Bayesian speaker verification with heavy-tailed priors," in Proc. Odyssey Speaker and Language Recognition Workshop, 2010, 10 pages.

Kinnunen et al., "Real-time speaker identification and verification," IEEE Transactions on Audio, Speech and Language Processing, Jan. 1, 2006, 14(1):277-288.

Kumar et al. "Multilingual Speaker Recognition Using Neural Networks," Proceedings of the Frontiers of Research on Speech and Music, Dec. 1, 2009, 11 pages.

Kuo and Goel, "Active learning with minimum expected error for spoken language understanding," in Interspeech, Sep. 2005, pp. 437-440.

Kurimo et al., "Personalising speech-to-speech translation in the EMIME project," Proceedings of the ACL 2010 System Demonstrations, pp. 48-53, Jul. 13, 2010.

KR Office Action issued in Korean Application No. 10-2018-7009479, dated Mar. 26, 2019, 6 pages (with English translation).

Lamel et al., "Lightly supervised and unsupervised acoustic model training," Computer Speech and Language, vol. 16, No. 1, pp. 115-229, Jan. 2002.

Lamel, Lori, et al. "Speech recognition for machine translation in Quaero." Proceedings of the International Workshop on Spoken Language Translation (IWSLT), San Francisco, CA. 2011.

Larcher et al. "Phonetically-constrained PLDA modeling for text-dependent speaker verification with multiple short utterances," in Proc. ICASSP, May 26-31, 2013, 7673-7677.

Lecun et al., "Gradient-based learning applied to document recognition," Proceedings of the IEEE, vol. 86, No. 11, pp. 2278-2324, Nov. 1998.

Lecun et al., "Learning methods for generic object recognition with invariance to pose and lighting," in Computer Vision and Pattern Recognition, 2004. CVPR 2004. Proceedings of the 2004 IEEE Computer Society Conference on, vol. 2. IEEE, Jul. 2004, pp. 11-97-104.

Lee et al.,"Unsupervised feature learning for audio classification using convolutional deep belief networks," in NIPS, 2009, pp. 1096-1104.

Lei et al., "Application of convolutional neural networks to language identification in noisy conditions," in Proc. Speaker Odyssey Workshop (submitted), 2014, 6 pages.

Liang et al., "A comparison of supervised and unsupervised cross-lingual speaker adaptation approaches for HMM-based speech synthesis," 2010 IEEE International Conference on Acoustics Speech and Signal Processing (ICASSP) pp. 4598-4601, Mar. 14-19, 2010.

Liao et al., "Large scale deep neural network acoustic modeling with semi-supervised training data for youtube video transcription," in Workshop on Automatic Speech Recognition and Understanding (ASRU), 2013, 6 pages.

Liao et al., "Large vocabulary automatic speech recognition for children," Interspeech 2015, pp. 1611-1615, Sep. 2015.

Ma and Schwartz, "Unsupervised versus supervised training of acoustic models," in Interspeech, Sep. 2008, pp. 2374-2377.

Macias-Guarasa et al., "Novel Applications of Neural Networks in Speech Technology Systems: Search Space Reduction and Prosodic Modeling," Intelligent Automation and Soft Computing, 2009, 15(4):631-646.

Matejka et al. "Analysis of DNN appreches to speaker identification," 2016 IEEE International Conference on Acoustics, Speech and Signal Processing, Mar. 20, 2016, 5 pages.

MathWorks Support Team, "Is it possible to impose constraints on a neural network using Neural Network Toolbox?" MATLAB AnswersTM, Jun. 27, 2009 [retrieved on Oct. 8, 2015]. Retrieved from the Internet: URL>http//www.mathworks.com/matlabcentral/answers/99132-is-it-possible-to-impose-constraints-on-a-neural-netowrk-using-neural-network-toolbox>, 3 pages.

McLaren et al., "Application of convolutional neural networks to speaker recognition in noisy conditions," in 15th Annual Conference of the International Speech Communication Association, Sep. 2014, pp. 686-690.

Melin, "Signature Recognition with a Hybrid Approach Combining Modular Neural Networks and Fuzzy Logic for Response Integration," Modular Neural Networks and Type-2 Fuzzy Systems for Pattern Recognition. Springer Berlin Heidelberg, 2012, pp. 77-92.

Microsoft Research, "Turning a monolingual speaker into multilingual speaker," Microsoft Research [online], Apr. 20, 2012 [retrieved on Jun. 17, 2013] Retrieved from the Internet using the Wayback Machine: < URL: http://web.archive.org/web/20120420120027/http://research.microsoft.com/en-us/projects/mixedlangtts/default.aspx> 3 pages.

Mohamed et al., "Deep Belief Networks for phone recognition," ICASSP, 2011, pp. 1-9.

IP India, Examination Report relating to Application No. 201847012909, dated Feb. 25, 2022.

Mohri et al., "Weighted Finite-State Transducers in Speech Recognition," Computer Speech and Language, vol. 16, issue 1, pp. 69-88, Jan. 2002.

Morgan et al., "Continuous speech recognition: An introduction to the hybrid HMM/connectionist approach," IEEE Signal Processing Magazine, vol. 12, No. 3, pp. 25-42, 1995.

Muller et al., "Designing Prosodic Databases for Automatic Modeling of Slovenian Language in Multilingual TTS System," Proceeding of the 3rd international conference on Language resources and Evaluation, LREC, 2002, May 2002, 5 pages.

Nair et al., "Rectified linear units improve restricted Boltzmann machines," in ICML, 2010, 8 pages.

Narusawa et al., "Automatic Extraction of Model Parameters From Fundamental Frequency Contours of English Utterances," 7th International Conference on Spoken Language Processing, ICSLP2002—Interspeech 2002 (Proc.ICSLP), 2002, 1725-1728.

Noth et al., "A Multilingual Prosody Module in a Speech-to-Speech Translation System," From the Proceeding of the Workshop ofiIlulti-Lingual Speech Communication, 2000, pp. 110-115.

Oglesby et al., "Optimisation of neural models for speaker identification," in Proc. ICASSP, Apr. 3-6, 1990, 1:261-264.

Oura et al., "Unsupervised Cross-Lingual Speaker Adaptation for HMM-Based Speech Synthesis," 2010 IEEE International Conference on Acoustics Speech and Signal Processing (ICASSP), pp. 4594-4597, Mar. 14-19, 2010.

Pennlio, "Fully-connected, locally-connected and shared weights layer in neural networks," Peng's Blog, Apr. 11, 2014 [retrieved on Sep. 8, 2015], Retrieved from the Internet: URL<https://pennlio.wordpress.com/?s=fully-connected%2C+locally-connected>, 4 pages.

Plchot et al. "Developing a speaker identification system for the DARPA RATS project," 2013 IEEE International Conference on Acoustics, Speech and Signal Processing, May 2013, 5 pages.

Prabhavalkar et al., "Automatic gain control and multi-style training for robust small-footprint keyword spotting with deep neural networks," Acoustics, Speech and Signal Processing (ICASSP), 2015 IEEE International Conference on, Apr. 2015, pp. 4704-4708.

Qian and Soong, "A unified trajectory tiling approach to high quality TTS and cross-lingual voice transformation," 2012 8th International Symposium on Chinese Spoken Language Processing (ISCSLP), Dec. 5-8, 2012, pp. 165-169.

Qian et al., "A cross-language state sharing and mapping approach to bilingual (Mandarin-English) TTS", In IEEE Transactions on Audio, Speech, and Language Processing, vol. 17, No. 6, pp. 1231-1239, 2009.

Qian et al., "A frame mapping based HMM approach to cross-lingual voice transformation," In ICASSP-2011, pp. 5120-5123, 2011.

Ramaswamy, Ganesh N. et al., "Compression of Acoustic Features for Speech Recognition In Network Environments," ICASSP 1998, 4 pages.

Rao et al. "Text-dependent Speaker Recognition System for Indian Languages," International Journal of Computer Science and Network Security, vol. 7, Nov. 1, 2007, 7 pages.

Rao et al., "Grapheme-to-Phoneme Conversion Using Long Short-Term Memory Recurrent Neural Networks," Proceedings of ICASSP, 2015, 5 pages.

Reynolds et al., "Speaker Verification Using Adapted Gaussian Mixture Models," Digital Signal Processing 10, 19-41 (2000).

(56) References Cited

OTHER PUBLICATIONS

Robinson et al., "A recurrent error propagation network speech recognition system," Computer Speech and Language, 5(3):259-274, Jul. 1991.
Romsdorfer, "Polygot Speech Prosody Control," Interspeech 2009 Brighton, 2009, pp. 488-491.
RU Office Action issued in Russian Application No. 2018112272, dated Feb. 21, 2019, 10 pages (with English translation).
Rumelhart et al. "Learning representations by back-propagating errors" Nature vol. 323, Oct. 9, 1986, 4 pages.
Rybach et al., "Direct construction of compact context-dependency transducers from data," Computer Speech and Language, vol. 28, issue 1, pp. 177-191, Jan. 2014.
Sainath et al., "Auto-encoder bottleneck features using deep belief networks," in IEEE International Conference on Acoustics, Speech, and Signal Processing (ICASSP), pp. 4153-4156, Mar. 2012.
Sainath et al., "Convolutional, long short-term memory, fully connected deep neural networks," in IEEE International Conference on Acoustics, Speech, and Signal Processing (ICASSP), pp. 4580-4584, Apr. 2015.
Sainath et al., "Deep Convolutional Neural Networks for LVCSR," Acoustics, Speech and Signal Processing (ICASSP), 2013 IEEE International Conference on, pp. 8614-8618, Dec. 2013.
Sak et al., "Fast and accurate recurrent neural network acoustic models for speech recognition," arXiv preprint arXiv:1507.06947, Jul. 2015, 5 pages.
Sak et al., "Language model verbalization for automatic speech recognition," in Acoustics, Speech and Signal Processing (ICASSP), 2013 IEEE International Conference on, IEEE, pp. 8262-8266, May 2013.
Sak et al., "Learning acoustic frame labeling for speech recognition with recurrent neural networks," in IEEE International Conference on Acoustics, Speech, and Signal Processing (ICASSP), pp. 4280-4284, Apr. 2015.
Sak et al., "Long short-term memory recurrent neural network architectures for large scale acoustic modeling," Interspeech 2014, pp. 338-342, Sep. 2014.
Sak et al., "Sequence discriminative distributed training of long short-term memory recurrent neural networks," in Interspeech, 2014, pp. 1209-1213.
Sakurai and Minematsu, "Generation of Fo Contours Using a Model-Constrained Data-Driven Method," ICASSP, 2001, pp. 817-820.
Salmon and Chen, "Exploring speaker-specific characteristics with deep learning," Neural Networks (IJCNN), The 2011 International Joint Conference on. IEEE, Aug. 2011, pp. 103-110.
Saon et al., "The IBM 2015 English conversational telephone speech recognition system," arXiv preprint arXiv:1505.05899, May 2015, 5 pages.
Schalkwyk et al., ""your word is my command": Google search by voice: A case study," in Advances in Speech Recognition, Springer, Aug. 2010, pp. 61-90.
Senior et al., "Context dependent phone models for LSTM RNN acoustic modelling," in Acoustics, Speech and Signal Processing (ICASSP), 2015 IEEE International Conference on, pp. 4585-4589, Apr. 2015.
Senior et al., "GMM-free DNN acoustic model training," in Acoustics, Speech and Signal Processing (ICASSP), 2014 IEEE International Conference on. IEEE, pp. 5602-5606, Apr. 2014.
Siohan, "Training data selection based on context-dependent state matching," in ICASSP, 2014.
Song et al., "End-to-End Deep Neural Network for Automatic Speech Recognition," Stanford University, CS224d: Deep Learning for Natural Language Processing, 2015 Report, pp. 1-8.
Soong et al., "A Vector Quantization Approach to Speaker Recognition," 1985 IEEE International Conference on Acoustics, Speech, and Signal Processing, vol. 10, Apr. 1985, 387-390.
Stafylakis et al., "Preliminary investigation of Boltzmann machine classifiers for speaker recognition," in Proc. Odyssey Speaker and Language Recognition Workshop, 2012, 8 pages.
Stafylakis et al., "Text-dependent speaker recognition using PLDA with uncertainty propagation," in Proc. Interspeech, 2013, 5 pages.
Sun et al., "Improved Prediction of Tone Components for Fo Contour Generation of Mandarin Speech Based on the Tone Nucleus Model," Proc. International Conference on Speech Prosody, 2008, 4 pages.
Tomar et al., "Efficient manifold learning for speech recognition using locality sensitive hashing, "Acoustics, Speech and Signal Processing (ICASSP), 2013 IEEE International Conference on. IEEE, 2013, pp. 6995-6999.
Unknown Author, "Unsupervised Feature Learning and Deep Learning Tutorial: Convolutional Neural Network," Stanford University, publically available before Jun. 12, 2015 [retrieved on Sep. 8, 2015]. Retrieved from the Internet: URL<http://ufkll.stanford.edu/tutorial/supervised/ConvolutionalNeuralNetwork/>, 2 pages.
Vaissiere, J., "Language Independent Prosodic Features." In A. Cutler & R. Ladd (Eds.), Prosody: Models and Measurements, (53-65), 1983, 34 pages.
Vanhoucke et al., "Improving the speed of neural networks on CPUs," in Deep Learning and Unsupervised Feature Learning Workshop, NIPS 2011, 2011; pp. 1-8.
Variani et al., "Deep neural networks for small footprint text-dependent speaker verification," in Acoustics, Speech and Signal Processing (ICAS SP), 2014 IEEE International Conference on. IEEE, May 2014, pp. 4080-4084.
Vasilakakis et al., "Speaker recognition by means of deep belief networks," (2013), (Published Oct. 2013; Presented on Oct. 14-15, 2013), 7 pages.
Vesely et al., "Sequence-discriminative training of deep neural networks," Interspeech, 2013, pp. 2345-2349.

FIG. 3

SPEAKER VERIFICATION

CROSS-REFERENCE TO RELATED APPLICATION

This U.S. patent application is a continuation of, and claims priority under 35 U.S.C. § 120 from, U.S. application Ser. No. 16/557,390, filed on Aug. 30, 2019, which is a continuation of PCT/US2017/040906, filed on Jul. 6, 2017, which claims priority under 35 U.S.C. § 119(a) from U.S. application Ser. No. 15/211,317, filed on Jul. 15, 2016. The disclosures of these prior applications are considered part of the disclosure of this application and are hereby incorporated by reference in their entireties

TECHNICAL FIELD

This specification generally relates to speaker verification.

BACKGROUND

Voice authentication provides an easy way for a user of a user device to gain access to a user device. Voice authentication allows a user to unlock, and access, the user's device without remembering or typing in a passcode. However, the existence of multiple different languages, dialects, accents, and the like presents certain challenges in the field of voice authentication.

SUMMARY

In one implementation, a speaker verification model improves upon conventional systems by facilitating speaker verification regardless of the speaker's language, dialect, or accent. The speaker verification model may be based on a neural network. The neural network may be trained using inputs that include an utterance and a language identifier. Once trained, activations output by a hidden layer of the neural network can be used as a voiceprint, which can be compared to a reference representation on the user's device. A speaker can be authenticated if the voiceprint and the reference representation satisfy a predetermined similarity threshold.

According to one implementation, the subject matter of this specification may be embodied in a method to facilitate language-independent speaker verification. The method may include the actions of: receiving, by a user device, audio data representing an utterance of a user; determining a language identifier associated with the user device; providing, to a neural network stored on the user device, a set of input data derived from the audio data and the determined language identifier, the neural network having parameters trained using speech data representing speech in different languages and different dialects; generating, based on output of the neural network produced in response to receiving the set of input data, a speaker representation indicative of characteristics of the voice of the user; determining, based on the speaker representation and a second representation, that the utterance is an utterance of the user; and providing the user access to the user device based on determining that the utterance is an utterance of the user.

Other versions include corresponding systems, apparatus, and computer programs to perform the actions of methods, encoded on computer storage devices.

These and other versions may optionally include one or more of the following features. For instance, in some implementations, the set of input data derived from the audio data and the determined language identifier includes a first vector that is derived from the audio data and a second vector that is derived from the determined language identifier.

In some implementations, the method may include generating an input vector by concatenating the first vector and the second vector into a single concatenated vector, providing, to the neural network, the generated input vector, and generating, based on output of the neural network produced in response to receiving the input vector, a speaker representation indicative of characteristics of the voice of the user.

In some implementations, the method may include generating an input vector by concatenating the outputs of at least two other neural networks that respectively generate outputs based on (i) the first vector, (ii) the second vector, or (iii) both the first vector and the second vector, providing, to the neural network, the generated input vector, and generating, based on output of the neural network produced in response to receiving the input vector, a speaker representation indicative of characteristics of the voice of the user.

In some implementations, the method may include generating an input vector based on the first vector and a weighted sum of the second vector, providing, to the neural network, the generated input vector, and generating, based on output of the neural network produced in response to receiving the input vector, a speaker representation indicative of characteristics of the voice of the user.

In some implementations, the output of the neural network produced in response to receiving the set of input data includes a set of activations generated by a hidden layer of the neural network.

In some implementations, determining, based on the speaker representation and a second representation, that the utterance is an utterance of the user may include determining a distance between the first representation and the second representation.

In some implementations, the method may include providing the user access to the user device based on determining that the utterance is an utterance of the user includes unlocking the user device.

Other implementations of the subject matter described by this specification include a method for language-independent speaker verification that include receiving, by a mobile device that implements a language-independent speaker verification model configured to determine whether received audio data likely includes an utterance of one of multiple language-specific hotwords, (i) particular audio data corresponding to a particular utterance of a user, and (ii) data indicating a particular language spoken by the user, and in response to receiving (i) particular audio data corresponding to a particular utterance of a user, and (ii) data indicating a particular language spoken by the user, providing, for output, an indication that the language-independent speaker verification model has determined that the particular audio data likely includes the utterance of a hotword designated for the particular language spoken by the user.

These and other versions may optionally include one or more of the following features. For instance, in one implementation, providing, for output, the indication may include providing access to a resource of the mobile device. Alternatively, or in addition, providing, for output, the indication may include unlocking the mobile device. Alternatively, or in addition, providing, for output, the indication may include waking up the mobile device from a low-power state. Alternatively, or in addition, providing, for output, the indication comprises providing an indication that language-independent speaker verification model has determined that the particular audio data includes the utterance of a particular user associated with the mobile device.

In some implementations, the language-independent speaker verification model may include a neural network trained without using utterances of the user.

The subject matter of this specification provides multiple advantages over conventional methods. For instance, the subject matter of the present application provides a speaker verification model that can be easily distributed. Since the speaker verification model is language, dialect, and accent independent the same speaker verification model can be widely distributed to user devices. This is exceedingly more efficient than providing different speaker verification models to different devices based on the language of the device user. Alternatively, it avoids the need to deploy multiple speaker verification models to the same device, of which the user can select one.

The speaker verification model provided by the present application demonstrates improved accuracy when using the same model to perform speaker verification independent of speaker language, dialect, or accent. For instance, variations in language, dialect, or accent can result in a particular user pronouncing a predetermined hotword in a different way than other users. This pronunciation difference can cause accuracy problems in conventional systems. The speaker verification model of the present disclosure improves upon this weakness of conventional systems.

The speaker verification model provided by the present application also provides ease of updating. For instance, a newly trained model can easily be deployed as part of a routine software update to a user device's operating system. Such updated speaker verification models may be easily trained to account for new languages, dialects, and/or accents as they arise. Alternatively, updates may be created to an existing version of the speaker verification model based on known languages, dialects, and/or accents. Such updated speaker verification models can be universally deployed, without the need to provide particular speaker verification models to specific devices in specific geographic regions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an example of a conceptual representation of a plurality of respective language identification vectors.

DETAILED DESCRIPTION

In some implementations, a system provides a language-independent speaker verification model, which can be a model based on a neural network, to a user device. The language-independent speaker verification model is trained, prior to installation on the user device, based training data that includes (i) utterances from multiple different users and (ii) vectors indicating languages or locations corresponding to the respective utterances. Once installed on the user device, the language-independent speaker verification model may be used to verify the identity of a user of the user device without subsequent training of the language-independent speaker verification model. While the user device may obtain and use utterances of the user to enroll the user, the model itself does not need to be trained based on any utterances of the user of the user device.

As used herein, a "language-independent" speaker verification model refers to a single model that can be used to accurately verify the identities of speakers that speak different languages or dialects. That is, the model is not dependent on or limited to speech being in a specific single language. As a result, rather than using different models for different languages, dialects, or accents, a single language-independent model can be used. In some implementations, a text-dependent model trained to identify a speaker based on utterance of a specific word or phrase, e.g., a predetermined hotword or attention word. A language-independent model may be trained to distinguish speakers of different languages based on a single hotword, or based on different hotwords for different languages or locations. Even when the same hotword is used in different languages or locations, users having different languages, dialects, accents, or locations may pronounce the hotword differently. These variations have decreased the accuracy of prior models, which often improperly attributed variability due to the regional language or accent as a speaker-distinctive characteristic. For example, the rate of false positives in verification be increased when a prior model interprets general features of a regional accent to be the main distinctive elements of a particular speaker's voice, when in fact the features are actually common to many other users who have a very similar accent. The present application obtains information about the language or location of a user and provides the information to the model, allowing the model to create speaker representations, e.g., voiceprints, that better distinguish a user from other users having the same language, dialect, accent, or location.

Figure 1:
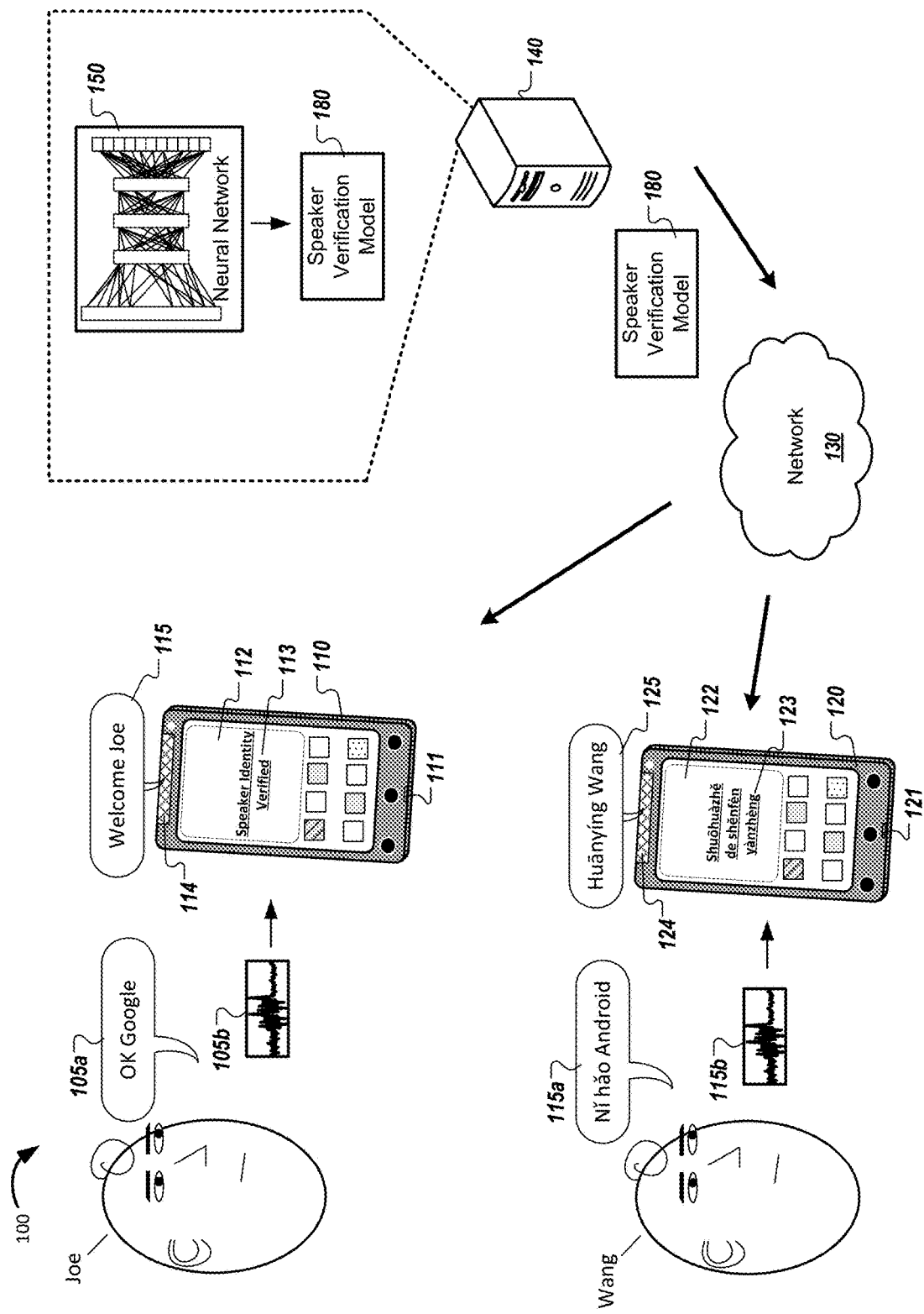
FIG. 1 shows a contextual diagram of an example of a system for using a language-independent speaker verification model to perform speaker verification.

FIG. 1 shows a contextual diagram of an example of a system 100 for using a language-independent speaker verification model to perform identity verification. The system 100 includes a user device 110, a user device 120, a network 130, a server 140, a neural network 150, and a speaker verification model 180.

The system 100 includes a server 140 that stores a neural network 150. The neural network 150 has been trained using speech data representing speech samples in different languages, different dialects, or both. The server 140 generates a speaker verification model 180 based on the neural network 150. Then, server 150 transmits a copy of the speaker verification model 180 through a network 130 to a first user device 110 and to a second user device 120. A copy of the speaker verification model 180 is then stored on each respective user device 110, 120.

A user, e.g., "Joe" may attempt to gain access to the user device 110 using voice authentication. For instance, Joe may utter a predetermined hotword 105a, or phrase, such as "Ok Google" in English. The audio 105b corresponding to the predetermined utterance may be detected by a microphone 111 of the user device 110. The user device 110 may generate a first input to the stored speaker verification model 180 that is derived from the audio 105b detected by the microphone 111. In addition, the user device 110 may derive a second input to the stored speaker verification model 180 based on the determination that Joe uttered the hotword 105a, or phrase, in the English language. The user device 110 may determine that Joe uttered the hotword 105a, or phrase, in the English language by obtaining a language setting of the device. The speaker verification model 180 stored on Joe's user device 110 may then generate, based on processing the first input derived from the audio 105b and the second input derived from Joe's use of the English language, a voiceprint for Joe. Based on an analysis of the generated voiceprint, the user device 110 may determine that Joe is authorized to access the device 110. In response to determining that Joe is authorized to access user device 110, the user device 110 can initiate processing that unlocks user device 110. In some instances, the user device 110 may display a message on the graphical user interface 112 that recites, for example, "Speaker Identity Verified" 113. Alternatively, or in addition, when the user device 110 is unlocked, a speaker of the user device 110 may output an audio greeting 115 that recites "Welcome Joe."

In the example of FIG. 1, another user, e.g., "Wang," has a user device 120 that also stores a copy of the same speaker verification model 180. Wang, a fluent speaker of the Chinese language, may attempt to gain access to the user device 120 using voice authentication. For instance, Wang may utter a predetermined hotword 115a, or phrase, such as "Nǐ hǎo Android" in Chinese (roughly translated as "Hello Android" in English). The audio 115b corresponding to the predetermined utterance may be detected by a microphone 121 of the user device 120. In addition, the user device 120 may derive a second input to the stored speaker verification model 180 based on the determination that Wang uttered the hotword 115a, or phrase, in the Chinese language. The user device 120 may determine that Joe uttered the hotword 115a, or phrase, in the Chinese language by obtaining a language setting of the device. The speaker verification model 180 stored on Wang's user device 120 may then generate, based on processing the first input derived from the audio 115b and the second input derived from Wang's use of the Chinese language, a voiceprint for Wang. Based on an analysis of the generated voiceprint, the user device 120 may determine that Wang is authorized to access the device 120. In response to determining that Wang is authorized to access user device 120, the user device 120 can initiate processing that unlocks user device 120. In some instances, the user device 120 may display a message on the graphical user interface 122 that recites, for example, "Shuōhuàzhě de shēnfèn yànzhèng" 123 (roughly translated as "Speaker Identity Verified" in English). Alternatively, or in addition, when the user device 120 is unlocked, a speaker of the user device 120 may output an audio greeting 125 that recites "Huānyíng Wáng" (roughly translated as "Welcome Wang" in English).

As shown in the example of FIG. 1, a single text-dependent speaker recognition model 180 can be configured to use different predetermined hotwords for different languages or locations. In addition, or as an alternative, the model 180 can use the same hotword for multiple languages or locations, but the model 180 can generate speaker representations with respect to different variations of the hotword's pronunciation, e.g., due to different languages or regional accents. As discussed below, the model 180 can fine-tune the verification process by inputting an identifier for a language or location to a neural network of the model 180 along with audio information.

Figure 2:
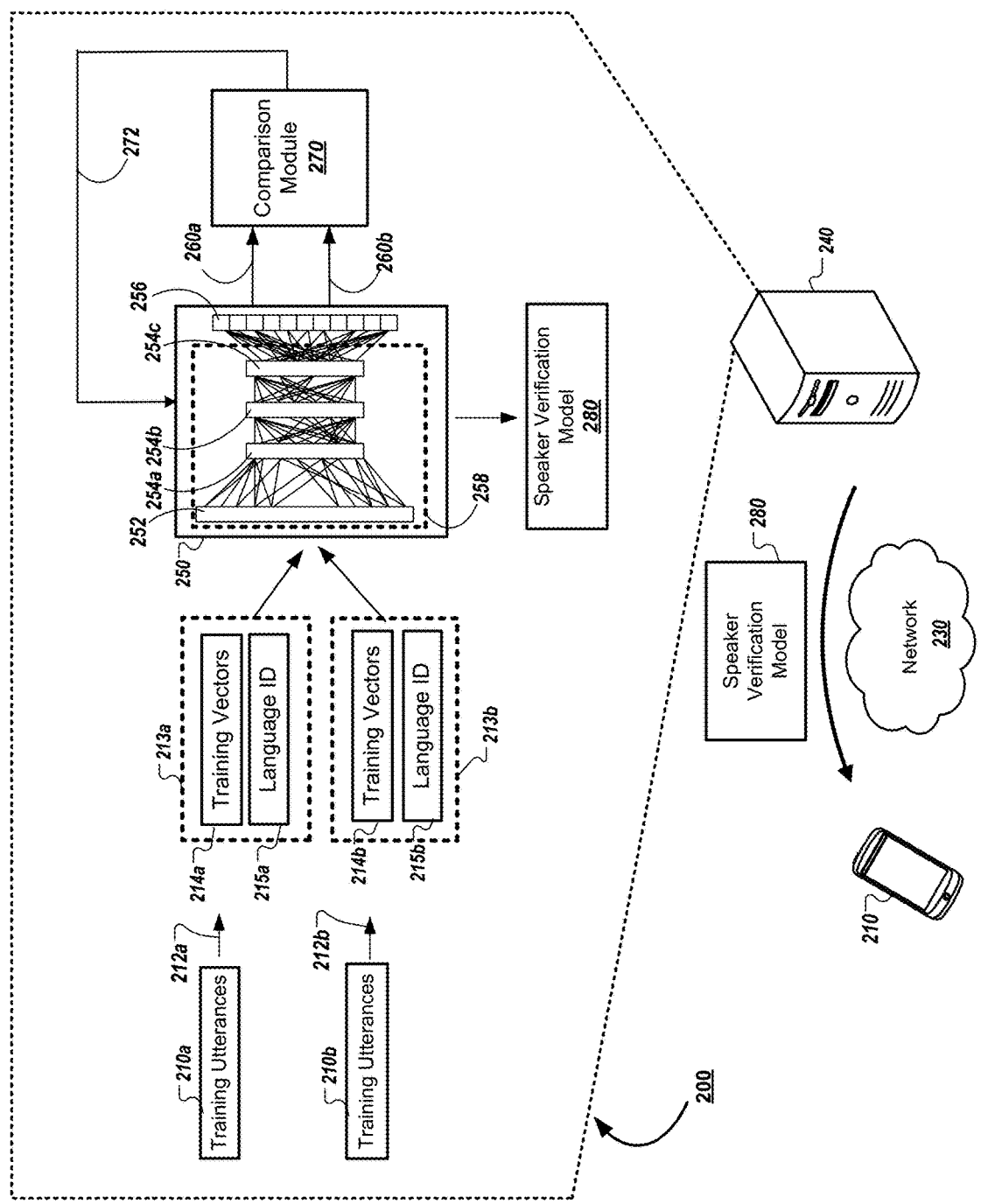
FIG. 2 is an example of a system for training a language-independent speaker verification model.

FIG. 2 is an example of a system 200 for training a language-independent speaker verification model 280. The system 200 includes a user device 210, a network 230, a server 240, and a neural network 250. In general, the training of the language-independent speaker verification model 280 occurs via processing that occurs on server 240, before the model 280 is distributed to the user device 210 and used to perform speaker recognition. Such training does not require user device 210 to be connected to network 230.

Before training can begin, server 240 obtains a set of training utterances 210a and 210b. The training utterances may include one or more speech samples that were each respectively uttered by multiple different training speakers, recorded, and stored in a training utterances repository made available to server 240. Each training utterance 210a, 210b may include at least a portion of the audio signal that results when a user utters the training utterance.

To facilitate voice authentication, the neural network 250 may be trained using training utterances that correspond to a predetermined hotword that can be uttered by a user of user device 210 during voice authentication. The training utterances may include utterances from multiple different users who each utter the same hotword in a different language, different dialect, different accent, or the like. In one implementation, multiple sets of training data may be used to train the neural network 250 with each training data set corresponding to a particular keyword utterance in a particular language, dialect, accent, or the like. For instance, a single neural network 250 may be trained with a set of training utterances from multiple different users uttering "Ok Google" in U.S. English, and another set of training data with multiple different users uttering "Ok Google" in British English. In one implementation, the single neural network 250 may similarly be trained with other training data sets that include the hotword "Ok Google" being uttered in different languages, different dialects, different accents, or the like until the neural network 250 has been trained for all known languages, dialects, accents, or the like. Alternatively, the single neural network 250 may be similarly trained with other training data sets that include the hotword "Ok Google" being uttered in different languages, different dialects, different accents, or the like until the neural network 250 has been trained for all languages, dialects, accents or the like in the regions where a speaker verification model based on the neural network 250 will be deployed. As used herein, a hotword can be a single word or a phrase that includes multiple words. In some implementations, the hotword for each language is fixed during training of the model, so that each user using the model in a particular location uses the same hotword.

The audio signals corresponding to the uttered training phrases may be captured and recorded. Though the examples of training utterances corresponding to a predetermined hotword, provided here include "Ok Google" and "Nǐ hǎo Android," the present disclosure need not be so limited. Instead, training utterances corresponding to any predetermined hotword, in any language or any dialect can be used to train the neural network 250. In addition, it is contemplated that the neural network 250 can be easily trained to accommodate all known languages, dialects, accents, or the like.

In some instances, a training speaker may be requested to utter, and record, the same training phrase multiple times in order to generate multiple different training utterances for the same training word or phrase. Training utterances may be obtained, in this manner, using multiple different speakers uttering the training word or phrase in multiple different languages, multiple different dialects, or the like. Once the training utterances 210a, 210b are obtained, the system 200 may derive 212a, 212b a respective feature vector for each training utterance that corresponds to the acoustic features of the related training utterance. The respective feature vector for each training utterance may include, for example, an N-by-1 vector that is derived from the training utterance and corresponds to acoustic features of the utterance. An N-by-1 vector may be conceptually modeled using a single column of N values. In one implementation, each of the N values in the N-by-1 vector may include a value of either "0" or "1".

The system 200 may also obtain multiple different language IDs 215a, 215b. Language IDs may include data that identifies a particular language. In one implementation, the language ID may include a one-hot language vector. Such one-hot language vectors may include a N-by-1 vector where only one feature of the language vector is activated. A particular feature of a language vector may be activated by, for example, setting the feature to a value of "1." Similarly, for any given one-hot language vector, all other features of the one-hot language vector will be deactivated. A feature of a language vector may be deactivated by, for example, setting the feature to "0."

Figure 3:
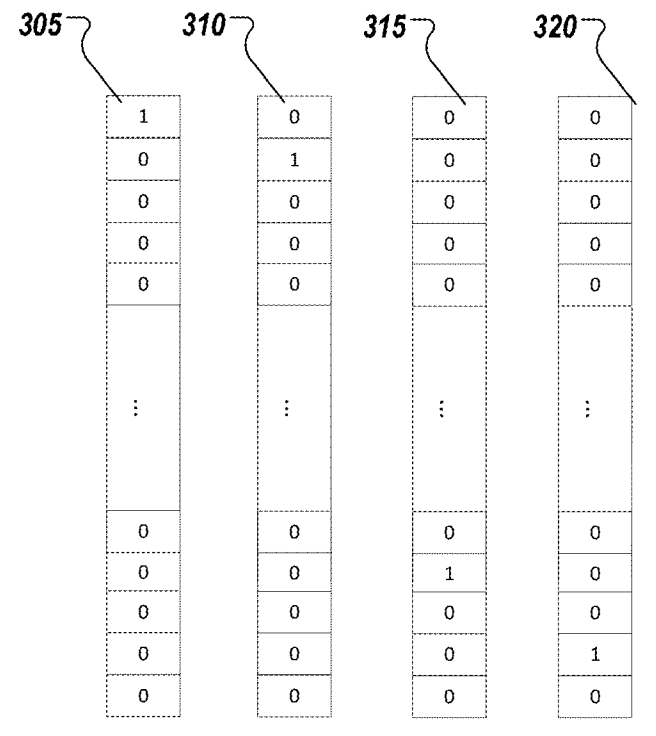

FIG. 3 is an example of a conceptual representation of a plurality of one-hot language vectors 305, 310, 315, 320. In each one-hot language vector 305, 310, 315, 310, only one feature has been activated, while all other features are deactivated. System 200 may associated each one-hot language vector 305, 310, 315, 320 with a particular language. For instance, system 200 may determine that a one-hot language vector with the first feature of the language vector activated such as the case with respect to language identification vector 305 may be associated with the "English" language. Similarly, system 200 may determine that a one-hot language vector 310 with the second feature of the vector activated such as the case with respect to language identification vector 310 may be associated with the "Chinese" language. Similar language associations may be made between the language identification vectors 315 and 320 and other languages.

Training of the speaker verification model 280 may begin by providing sets of training data to the neural network 250. In one implementation, neural network 250 may be trained using a pair-wise training technique. For instance, a first set of training data 213a is input into the neural network 250 that includes a training utterance vector 214a and a second input that includes a language ID 215a. The language ID 215a may include, for example, a one-hot language vector that identifies the language or dialect used by the training speaker that provided the training utterance 210a from which the training utterance vector 214a was derived. The neural network 250 processes the first set of training data 213a and generates an output 260a. Subsequently, a second set of training data 213b is input into the neural network 250. The neural network 250 processes the second set of training data 213b and generates an output 260b. The outputs 260a, 260b are then compared using a comparator 270. The comparator 270 analyzes the outputs 260a, 260b to determine whether the training vectors 214a, 214b were derived from training utterances 210a, 210b that were uttered by the same speaker. In one implementation, the comparison module 440 may determine whether the training vectors 214a, 214b were derived from training utterances 210a, 210b that were uttered by the same speaker by calculating the distance between the outputs 260a, 260b. Such a distance may be calculated, for example, using the cosine similarity.

The output 272 of the comparison module provides an indication of whether the training utterances 210a, 210b were uttered by the same speaker. In one implementation, for example, the output 272 may be a binary value that is comprised of either a '0' or a '1'. In such an implementation, a '0' may indicate that the utterances were not from the same speaker. On the other hand, a '1' may indicate that the utterance were from the same speaker. Alternatively, the output 272 may be a value that can be mapped to a binary value such as a '0' or a '1.' For instance, the output 272 may include a probability that is indicative of whether the training utterances 210a, 210b were uttered by the same speaker. The parameters of the neural network 250 may then be adjusted based on the output 272 of the comparison module 270. In some implementations, the parameters of the neural network 250 may be adjusted automatically based on output 272. Alternatively, in some implementations, one or more parameters of the neural network may be adjusted manually based on the output 272. Multiple sets of training data may be processed in this manner until a comparison of the two outputs 260a, 260b consistently indicates whether a pair of training vectors such as 214a, 214b were derived from utterances 210a, 210b that were uttered by the same speaker.

The neural network 250 may include an input layer 252 for inputting a sets of training data, multiple hidden layers 254a, 254b, 254c for processing the sets of training data, and an output layer 256 for providing output. Each hidden layer 254a, 254b, 254c may include one or more weights or other parameters. The weights or other parameters of each respective hidden layer 254a, 254b, 254c may be adjusted so that the trained neural network produces the desired target vector corresponding to each set of training data. The output of each hidden layer 254a, 254b, 254c may generate a M-by-1 activation vector. The output of the last hidden layer such as 254c may be provided to the output layer 256, which performs additional computations of the received activation vector in order to generate a neural network output. Once the neural network 250 reaches a desired level of performance the neural network 250 may designated as a trained neural network. For example, the neural network 250 may be trained until the network 250 can distinguish between speech of different speakers, and identify matches between speech of the same speaker, with less than a maximum error rate.

A set of training data such as 213a that includes a training utterance vector 214a and a language ID 215a may be pre-processed before being provided as a training input to a neural network 250 in a variety of different ways. For instance, the training utterance vector 214a and the language ID 215a such as one-hot language vector may be concatenated. In such instances, the concatenated vector may be provided as the input to the neural network 250 during training. Alternatively, the system 200 may generate the input to the neural network 250 by concatenating the outputs of at least two other neural networks that have respectively generated outputs based on each respective neural network's processing of the training utterance vector 214a, the one-hot language vector, or both the training utterance vector 214a and the one-hot language vector. In such instances, the concatenated output of the two or more other neural networks may be used to train the neural network 250. Alternatively, the system 200 may generate an input vector based the training utterance vector 214a and a weighted sum of the one-hot language vector. Other methods of generating a set of training data based on the training utterance vector 214a and a one-hot language vector can be used.

A portion 258 of the neural network 250 may obtained once the neural network 250 is designated as trained, and used to generate a speaker verification model 280. The obtained portion 258 of the neural network 250 may include the input layer 252 of the neural network 250 and one or more hidden layers of the neural network 254a. In some implementations, however, the obtained portion of the neural network 250 does not include the output layer 256. Once trained, the neural network 250 is capable of produced an activation vector as an output of the last hidden layer of the obtained portion 258 that can be used as a voiceprint for speaker. The voiceprint may be used by a user device to verify the identity of a person who provides an utterance of a hotword to the user device.

The server 240 transmits a copy of the speaker verification model 280 through a network 230 to one or more respective user devices such as user device 210. A copy of the speaker verification model 280 is then stored on each respective user device 110, and can be used to facilitate language-independent speaker identity verification. As another example, the speaker verification model 280 may be pre-installed on the user device 210, e.g., with an operating system of the user device 210.

Figure 4:
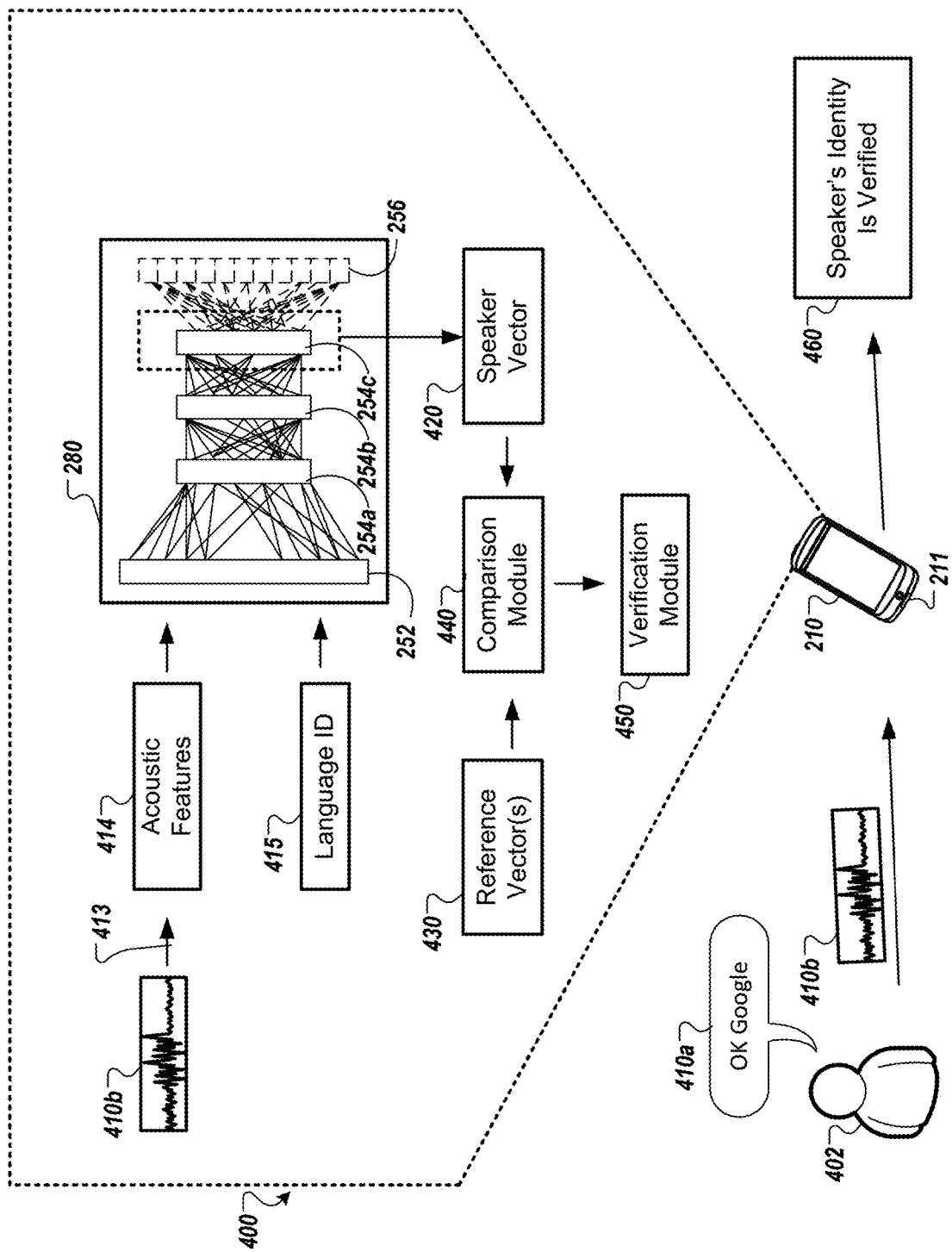
FIG. 4 is an example of a system that performs language-independent speaker verification.

FIG. 4 is an example of a system 400 that performs language-independent speaker identity verification. The system 400 includes a user device 210, a speaker verification model 280, a comparison module 440, and a verification module 450.

In the example shown in FIG. 4, a user 402 attempts to access a user device 210 using voice verification. The user device 210 that has previously received, and stored, a speaker verification model 280 provided by the server 240 via network 230. To access the user device 210 using voice verification, the user 402 utters a predetermined hotword 410a, or phrase, such as "Ok Google." The audio 410b corresponding to the predetermined hotword 410a, or phrase, "Ok Google" is detected by a microphone 211 of the user device 210. The user device 410b may derive 413 an acoustic feature vector from the audio 410b that represents to the acoustic features of audio 410b.

In addition, the system 400 may obtain a language ID 415 that is stored in a language ID storage area of the user device 210. A language ID may include data that identifies a particular language or dialect associated with the user. In one implementation, the language ID may include a one-hot language vector. The language ID 415 that is stored on any particular user device 210 may be set to a particular language ID from a set of multiple different language IDs corresponding to known languages and dialects in any number of different ways. For instance, a user may select a particular language or dialect when powering on, and configuring, the user device 210 for the first time after purchase of the user device 210. A corresponding language ID may be selected, and stored in the user device 210, based on the particular language or dialect selected by the user.

Alternatively, or in addition, a particular language ID may be selected, and stored in the user device 210, based on the location of the device. For instance, a user device 210 may establish a default setting for the language ID based on the location where the device was first activated, current location of the device, or the like. Alternatively, or in addition, the user device 210 may dynamically detect a particular language or dialect associated with a user based on speech samples obtained from the user. The dynamic detection of the particular language or dialect associated with the user may be determined, for example, when the user utters the predetermined hotword, during speaker authentication. In such instances, a corresponding language ID may be selected, and stored on the user device 210, based on the language or dialect detected from the user's speech samples. Alternatively, or in addition, the user may modify a language or dialect setting associated the user device 210 in order to select a particular language or dialect at any time. In such instances, a corresponding language ID may be selected, and stored on the user device 210, based on the user's modification of the user device 210 language or dialect settings.

The acoustic feature vector 414 and the language ID 415 may be provided as an input to the speech verification model 280 that is based on at least portion of the trained neural network 250. For instance, the speech verification model 280 may include one or more layers of the trained neural network 250 such as, for example, the input layer 252 and one or more hidden layers 254a, 254b, 254. In one implementation, however, the speech verification model 280 does not utilize the output layer 256 of the neural network 250.

The acoustic feature vector 414 and the language ID 415 can be provided as input to the speech verification model 280 in a variety of different ways. For instance, the acoustic feature vector 414 and the language ID 415 such as one-hot language vector may be concatenated. In such instances, the concatenated vector may be provided as input to the speech verification model. Alternatively, the system 400 may concatenate the outputs of at least two other neural networks that have respectively generated outputs based on each respective neural network's processing of the acoustic feature vector 414, the language ID 415 such as a one-hot language vector, or both the acoustic feature vector 414 and the language ID 415. In such instances, the concatenated output of the two or more other neural networks may be provided to the speech verification model 280. Alternatively, the system 400 may generate an input vector based the acoustic feature vector 414 and a weighted sum of a one-hot language vector being used as a language ID 415. Other methods of generating input data to the speech verification model 280 based on the acoustic feature vector 414 and language ID 415 can be used.

The speech verification model's 280 processing of the provided input data based on the acoustic feature vector 414 and the language ID 415 may result in the generation of a set of activations at one or more hidden layers of the speech verification model's 280 neural network. For instance, the speech verification models' 280 processing of the provided input can result in a set of activations being generated at a first hidden layer 254a, a second hidden layer 255b, a third hidden layer 254c, or the like. In one implementation, the system 400 may obtain the activations output by the final hidden layer 254c of the speech verification model's 280 neural network. The activations output by the final hidden layer 254c may be used to generate a speaker vector 420. This speaker vector 420 provides a representation that is indicative of characteristics of the voice of the user. This speaker vector may be referred to as a voiceprint. The voiceprint can be used to uniquely verify the identity of a speaker based on the characteristics of the user's voice.

A comparison module 440 may be configured to receive the speaker vector 420 and a reference vector 430. The reference vector 430 may be a vector that has been derived from a previous user utterance captured by the device, e.g., an utterance provided during enrollment of the user with the device. For instance, at some point in time prior to the user's 402 use of system 400 to unlock the user device 210 using voice authentication, the user 402 may utter phrase such as "Ok Google" one, or multiple times. The user device 210 can be configured to use a microphone 211 to capture the audio signals that correspond to the user's utterances. The user device 210 can then derive reference feature vector 430 from the audio signals that correspond to at least one of the uttered phrases captured at some point in time prior to the user's 402 use of system 400 to unlock the user device 210 using voice authentication. The reference vector 430 may provide a baseline representation of the characteristics of the user's 402 voice that the generated voiceprint can be compared to. In one implementation, the reference vector 430 may be generated based on the user's 402 utterance of a predetermined hotword, which can be uttered to unlock the phone during voice authorization.

The comparison module 440 may determine the level of similarity between the speaker vector 420 and the reference vector 430. In one implementation, the comparison module 440 can calculate a similarity measure between the speaker vector 420 and the reference vector 430. In some instances, the comparison module 440 can determine whether the similarity measure between the speaker vector 420 and the reference vector 430 exceeds a predetermined threshold. In those instances where the similarity measure exceeds the predetermined threshold, the comparison module 440 may provide output data to the verification module 450 indicating that the similarity measure exceeded the predetermined threshold. Alternatively, the comparison module 440 may determine that the similarity measure does not exceed the predetermined threshold. In such instances, the comparison module 440 may provide output data to the verification module 450 indicating that the similarity measure did not exceed the predetermined threshold.

In some implementations, the similarity measure between the speaker vector 420 and the reference vector 430 may be calculated based on a distance between the speaker vector 420 and the reference vector 430. The comparison module 440 may be configured to determine the distance between the speaker vector 420 and the reference vector 430. In one implementation, the distance between the speaker vector 420 and the reference vector 430 may be determined, for example, using a cosine function. The cosine function can determine the distance between the speaker vector 420 and the reference vector 430 by measuring the angle between the two vectors.

The verification module 450 receives and interprets the output data that the verification module 450 receives from the comparison module 440. Based on the output data received from the comparison module 440, the verification module may determine whether the user 402 that uttered phrase 410a from which the speaker vector 420 was derived is the same user who previously uttered the phrase from which the reference vector 430 was derived. If it is determined that the user 402 that uttered the phrase 410a from which the speaker vector 420 was derived is the same user who previously uttered the phrase from which the reference vector 430 was derived, the verification module 450 may instruct an application executing on user device 210 to provide user 402 with access to the device 420. Alternatively, or in addition, upon a determination that the user 402 that uttered the phrase 410a from which the speaker vector 420 was derived is the same user who previously uttered the phrase from which the reference vector 420 was derived, the verification module 450 may provide access to a particular resource on the device, unlock the device, wake the device up from a low power state, or the like.

The verification module 450 may determine, based on the output data from the comparison module 440, that the user who uttered the phrase 410a is the same user who uttered the phrase from which the reference vector 430 was derived if the output data from the comparison module 440 indicates that the similarity measure exceeds the predetermined threshold. In such instances, it the verification module may determine that the user is fully authenticated and authorized to use the user device 210. Alternatively, the verification module 450 may determine, based on the output data from the comparison module 440, that that the verification module 450 cannot conclude that the user 402 who uttered the phrase 410a is the same user who uttered the reference vector 430. In such instances, the user 402 is not authenticated, and is not provided with access to the device. Instead, the system 400, user device 210, one or more other applications, or a combination thereof may provide alternative options for accessing the user device 210. For instance, the user device 210 may prompt the user 402 to enter a secret passcode.

When a user 402 has been authenticated, by determining that the user 402 who uttered the phrase 410a is the same user who uttered the phrase from which the reference vector 430 was derived, the user device 210 unlocks and may output a message 460 to the user indicating that the "Speaker's Identity is Verified." This message may be a text message displayed on a graphical user interface of the user device 210, an audio message output by a speaker of the user device 210, a video message displayed on the graphical user interface of the user device 210, or a combination of one or more of the aforementioned types of messages.

Figure 5:
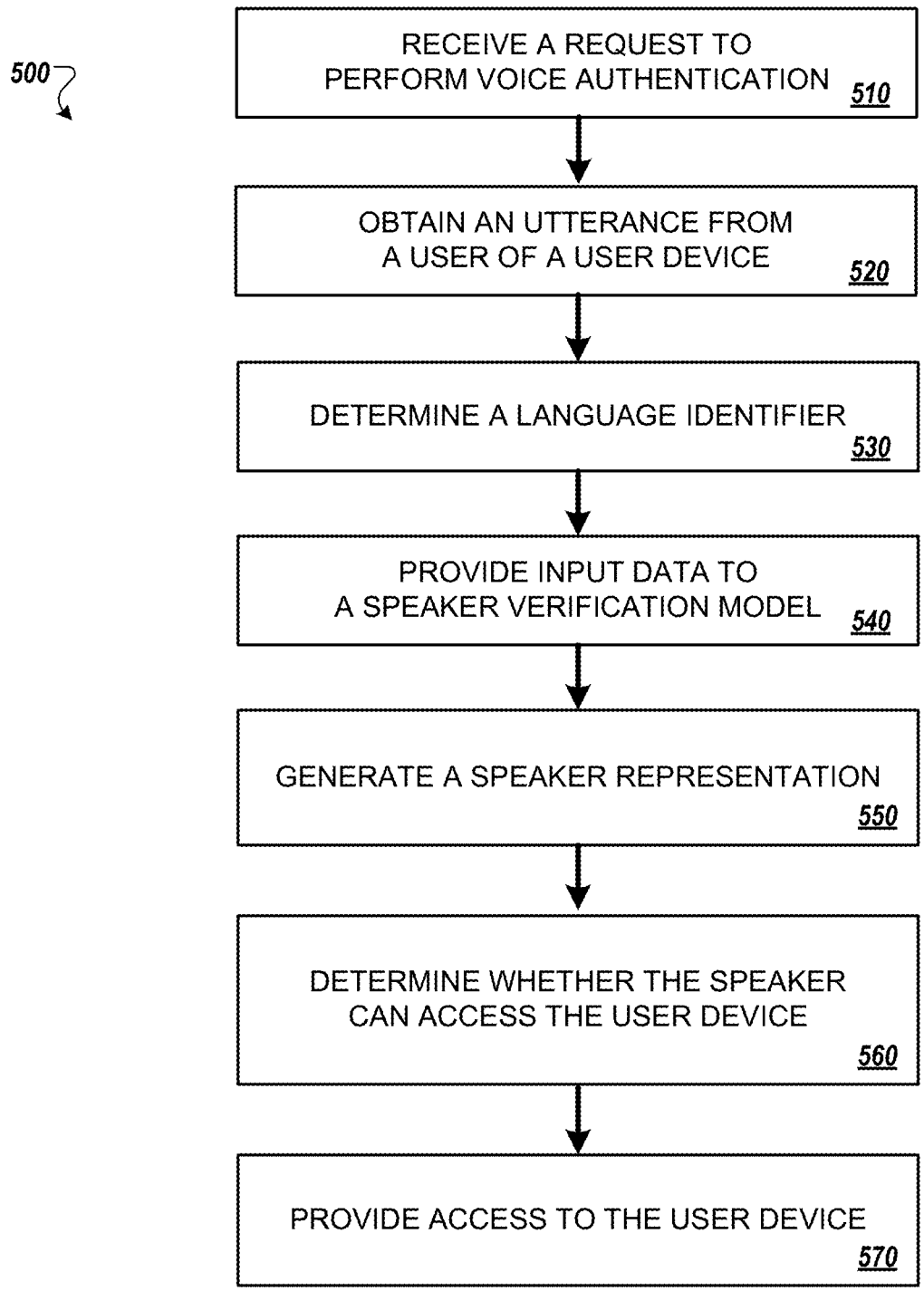
FIG. 5 is a flowchart of a process for performing language-independent speaker verification.

FIG. 5 is a flowchart of a process 500 for performing language-independent speaker identity verification. For convenience, the process 500 will be described as being performed by a system. For example, the system 400 discussed above can perform the process 500 to authenticate a user attempting to access a user device 210.

The process 500 may begin when a user device 210 receives 510 a request to perform voice authentication from a user of the device. In some implementations, the user may have to select a button on the user device, perform a gesture on the user interface of the user device, perform a gesture in the air in the line of sight of a camera of the user device, or the like in order to instruct the phone to initiate voice authentication of the user. In such instances, after the instruction to initiate voice authentication is received, the user may utter a predetermined hotword, in any language or dialect that can be used to verify the identity of the user. Alternatively, or in addition, the user device 210 may use a microphone to passively "listen" for the detection of a predetermined uttered hotword, in any language or dialect that may be used to initiate voice authentication of the user. A predetermined hotword, may include, for example "Hello Phone," "Ok Google," "Nǐ hǎo Android," or the like. In some implementations, there is a single fixed hotword for all users in a particular location or all users that speak a particular language.

The process can continue at 520 when the system 400 obtains an utterance input by a user of the user device 210. The utterance may include, for example, a predetermined hotword, in any language or dialect that may be used to initiate voice authentication of the user. The system 400 may derive an acoustic feature vector from the audio signals corresponding to the obtained utterance.

The system 400 can determine 530 a language identifier associated with the user device 210. A language identifier may include data that identifies a particular language or dialect associated with the user. In one implementation, the language identifier may include a one-hot language vector. The language identifier that is stored on any particular user device 210 may be set to a particular language identifier from a pool of multiple different language identifiers corresponding to known languages and dialects in any number of different ways, for example, as described above. However, subject matter of the present specification is not limited to only currently know languages or dialects. For instance, the speaker verification model can be trained to accommodate new languages, dialects, or accents. When a speaker verification model is re-trained, mappings between languages or locations and identifiers may be adjusted, e.g., to add new locations or languages.

The system 400 may provide 540 input data to the speaker verification model based on the acoustic feature vector and the language identifier. The input may be provided to the speaker verification model in a variety of different ways. For instance, the acoustic feature vector and the language identifier such as one-hot language vector may be concatenated. In such instances, the concatenated vector may be provided as input to the speech verification model. Alternatively, the system 400 may concatenate the outputs of at least two other neural networks that have respectively generated outputs based on each respective neural network's processing of the acoustic feature vector, the language identifier such as a one-hot language vector, or both the acoustic feature vector and the language identifier. In such instances, the concatenated output of the two or more other neural networks may be provided to the speech verification model. Alternatively, the system 400 may generate an input vector based the acoustic feature vector and a weighted sum of a one-hot language vector being used as a language identifier. Other methods of generating input data to the speech verification model 280 based on the acoustic feature vector and language identifier may be used.

The system 400 may generate a speaker representation based on the input provided in 540. For instance, the speaker verification model may include a neural network that processes the input provided in 540 and generates a set of activations at one or more hidden layers. The speaker representation may then be derived from a particular of set of activations obtained from at least one hidden layer of the neural network. In one implementation, the activations may be obtained from the last hidden layer of the neural network. The speaker representation may include a feature vector that is indicative of characteristics of the voice of the user.

At 560, the system 400 may determine whether the speaker of the utterance obtained in stage 520 can access the user device 210. This determination may be based on, for example, a comparison of the speaker representation to a reference representation. The reference may be a feature vector that was derived from a user utterance input into the user device 210 at some point in time prior to the user requesting to access the user device using voice authentication. The comparison of the speaker representation to the reference representation may result in the determination of a similarity measure that is indicative of the similarity between the speaker representation and the reference representation. The similarity measure may include a distance between the speaker representation and the reference representation. In one implementation, the distance may be calculated using a cosine function. If it is determined that the similarity measure exceeds a predetermined threshold, the system 400 may determine to provide 570 the user with access to the user device 210.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A computer-implemented method when executed on data processing hardware implemented on a server causes the data processing hardware to perform operations comprising:
    receiving training utterances of a particular word or phrase spoken by different training speakers in different languages or dialects;
    from each training utterance, deriving a respective feature vector corresponding to acoustic features associated with the training utterance;
    training a neural network on multiple training data sets to generate a language-independent speaker verification model, each training data set associated with a corresponding one of the training utterances and comprising:
        the respective feature vector derived from the corresponding training utterance; and
        a respective language identifier that identifies the respective language or dialect of the corresponding training utterance; and
    transmitting, from the server, through a network, a copy of the generated language-independent speaker verification model generated to one or more user devices, each of the one or more user devices configured to store the copy of the language-independent speaker verification model for use in performing language-independent speaker verification on utterances of the particular word or phrase.

2. The computer-implemented method of claim 1, wherein receiving the training utterances comprises receiving multiple sets of training utterances, each set of training utterances comprising respective training utterances of the particular word or phrase spoken in a respective language or dialect different than the respective languages or dialects associated with the other sets of training utterances.

3. The computer-implemented method of claim 2, wherein the respective training utterances of the particular word or phrase are spoken by multiple different users in the respective language or dialect.

4. The computer-implemented method of claim 1, wherein the respective feature vector derived from each training utterance comprises an N-by-1 vector.

5. The computer-implemented method of claim 1, wherein the respective language identifier of each set of the training data comprises an N-by-1 vector.

6. The computer-implemented method of claim 5, wherein the N-by-1 vector comprises a one-hot language vector.

7. The computer-implemented method of claim 1, wherein training the neural network on the multiple training data sets comprises, for each training data set:
receiving, as input to the neural network, the corresponding training data set;
generating, as output from the neural network, a corresponding speaker representation;
comparing the corresponding speaker representation generated as output from the neural network for the corresponding training data set to a previous speaker representation generated as output from the neural network for another one of the training data sets previously received as input to the neural network to determine whether or not the respective feature vector of the corresponding training data set and the respective feature vector of the another one of the training data sets were derived from training utterances spoken by a same training speaker; and
updating parameters of the neural network based on the comparing.

8. The computer-implemented method of claim 7, wherein receiving the corresponding training data set as input to the neural network comprises receiving an input vector generated by concatenating the respective feature vector and a language vector corresponding to the respective language identifier of the corresponding training data set.

9. The computer-implemented method of claim 1, wherein the neural network comprises:
an input layer configured to receive each training data set of the multiple training data sets;
a plurality of hidden layers configured to process the training data sets; and
an output layer configured to generate a corresponding neural network output for each training data set received by the input layer and processed by the plurality of hidden layers.

10. The computer-implemented method of claim 9, wherein the generated language-independent speaker verification model comprises the input layer and the plurality of hidden layers of the trained neural network.

11. A system comprising:
data processing hardware implemented on a server; and
memory hardware in communication with the data processing hardware and storing instructions that when executed on the data processing hardware causes the data processing hardware to perform operations comprising:
receiving training utterances of a particular word or phrase spoken by different training speakers in different languages or dialects;
from each training utterance, deriving a respective feature vector corresponding to acoustic features associated with the training utterance;
training a neural network on multiple training data sets to generate a language-independent speaker verification model, each training data set associated with a corresponding one of the training utterances and comprising:
the respective feature vector derived from the corresponding training utterance; and
a respective language identifier that identifies the respective language or dialect of the corresponding training utterance; and
transmitting, from the server, through a network, a copy of the generated language-independent speaker verification model generated to one or more user devices, each of the one or more user devices configured to store the copy of the language-independent speaker verification model for use in performing language-independent speaker verification on utterances of the particular word or phrase.

12. The system of claim 11, wherein receiving the training utterances comprises receiving multiple sets of training utterances, each set of training utterances comprising respective training utterances of the particular word or phrase spoken in a respective language or dialect different than the respective languages or dialects associated with the other sets of training utterances.

13. The system of claim 12, wherein the respective training utterances of the particular word or phrase are spoken by multiple different users in the respective language or dialect.

14. The system of claim 11, wherein the respective feature vector derived from each training utterance comprises an N-by-1 vector.

15. The system of claim 11, wherein the respective language identifier of each set of the training data comprises an N-by-1 vector.

16. The system of claim 15, wherein the N-by-1 vector comprises a one-hot language vector.

17. The system of claim 11, wherein training the neural network on the multiple training data sets comprises, for each training data set:
receiving, as input to the neural network, the corresponding training data set;
generating, as output from the neural network, a corresponding speaker representation;
comparing the corresponding speaker representation generated as output from the neural network for the corresponding training data set to a previous speaker representation generated as output from the neural network for another one of the training data sets previously received as input to the neural network to determine whether or not the respective feature vector of the corresponding training data set and the respective feature vector of the another one of the training data sets were derived from training utterances spoken by a same training speaker; and
updating parameters of the neural network based on the comparing.

18. The system of claim 17, wherein receiving the corresponding training data set as input to the neural network comprises receiving an input vector generated by concatenating the respective feature vector and a language vector corresponding to the respective language identifier of the corresponding training data set.

19. The system of claim 11, wherein the neural network comprises:
an input layer configured to receive each training data set of the multiple training data sets;
a plurality of hidden layers configured to process the training data sets; and an output layer configured to generate a corresponding neural network output for each training data set received by the input layer and processed by the plurality of hidden layers.

20. The system of claim 19, wherein the generated language-independent speaker verification model comprises the input layer and the plurality of hidden layers of the trained neural network.

* * * * *